United States Patent [19]

Dorey

[11] 4,419,758

[45] Dec. 6, 1983

[54] TRANSMISSION SYSTEMS FOR TRANSMITTING SIGNALS OVER POWER DISTRIBUTION NETWORKS, AND TRANSMITTERS FOR USE THEREIN

[75] Inventor: Howard A. Dorey, Godalming, England

[73] Assignee: Sangamo Weston Limited, Enfield, England

[21] Appl. No.: 235,277

[22] Filed: Feb. 17, 1981

[30] Foreign Application Priority Data

Feb. 18, 1980 [GB] United Kingdom ............... 8005454

[51] Int. Cl.³ .............................................. H04B 7/02
[52] U.S. Cl. ...................................... 375/38; 375/81; 455/59; 340/825.73
[58] Field of Search .................... 375/38, 40, 62, 81, 375/91, 94, 98, 100, 107; 370/45; 340/310 R, 825.73; 455/27, 59, 216, 313–315,337; 329/112, 50; 179/2 E; 307/2

[56] References Cited

U.S. PATENT DOCUMENTS

| | | | |
|---|---|---|---|
| 3,490,044 | 11/1968 | Easton | 455/59 |
| 3,495,244 | 2/1970 | Rosa | 375/98 |
| 3,794,928 | 2/1974 | Stump et al. | 375/81 |
| 3,943,515 | 3/1976 | Miley | 455/59 |
| 3,952,294 | 4/1976 | Emerson et al. | 340/310 R |
| 3,963,988 | 6/1976 | Niethammer | 375/40 |
| 3,980,954 | 9/1976 | Whyte | 340/310 R |
| 4,063,174 | 12/1977 | Gupta | 375/40 |
| 4,081,748 | 3/1978 | Batz | 375/40 |
| 4,090,135 | 5/1978 | Farstad et al. | 375/62 |
| 4,208,630 | 6/1980 | Martinez | 375/107 |
| 4,223,405 | 9/1980 | Hattori et al. | 455/59 |

FOREIGN PATENT DOCUMENTS

| | | |
|---|---|---|
| 485419 | 5/1938 | United Kingdom . |
| 640651 | 7/1950 | United Kingdom . |
| 820129 | 9/1959 | United Kingdom . |
| 824364 | 11/1959 | United Kingdom . |
| 856972 | 12/1960 | United Kingdom . |
| 1074722 | 7/1967 | United Kingdom . |
| 1088261 | 10/1967 | United Kingdom . |
| 1110783 | 4/1968 | United Kingdom . |
| 1267652 | 3/1972 | United Kingdom . |
| 1519058 | 7/1978 | United Kingdom . |

Primary Examiner—Benedict V. Safourek
Assistant Examiner—Stephen Chin
Attorney, Agent, or Firm—Dale Gaudier

[57] ABSTRACT

A transmission system, for transmitting signals over an electrical power distribution circuit, comprises a transmitter arranged to produce at least two carrier signals of different frequency and to modulate each of them with the same digital signal. The respective frequencies of the carrier signals are derived by frequency division from a common master oscillator, and are thus phase-coherent. The system includes a receiver for receiving the signals, comprising a respective input circuit for each modulated carrier, the input circuits each being tuned to the frequency of their respective carrier signal. A plurality of oscillator signals of different frequencies, derived from a variable frequency oscillator, are used to beat the received carrier signals to respective signals at a common frequency, which signals are summed. The summed signal at the common frequency is applied to one input of a phase detector, whose other input is connected to receive another oscillator signal, also at the common frequency, from the variable frequency oscillator. The output signal from the phase detector is applied to the variable frequency oscillator to lock its frequency to those of all the carriers and therefore to that of the master oscillator in the transmitter. The digital signal is derived from the output of the phase detector by digital correlation techniques.

23 Claims, 5 Drawing Figures

TRANSMISSION SYSTEMS FOR TRANSMITTING SIGNALS OVER POWER DISTRIBUTION NETWORKS, AND TRANSMITTERS FOR USE THEREIN

BACKGROUND OF THE INVENTION

1. Field of the Invention

This invention relates to transmission systems for transmitting signals, such as remote control signals and/or data signals, over electrical power distribution networks, and to transmitters and receivers for use in such transmission systems.

2. Description of the Prior Art

It has been proposed that such functions as tariff-switching, load-shedding and remote meter reading in electrical power distribution networks could be effected by means of radio-frequency carrier signals, which are modulated with digital signals and then transmitted over the wires of the network by modulating the network supply voltage with the modulated carrier signal. Our co-pending U.S. patent application Ser. No. 234,533, filed simultaneously herewith, describes and claims a receiver suitable for receiving such signals, even when they are relatively weak and heavily contaminated by noise.

However, the aforementioned proposal suffers from the serious drawback that for any given carrier frequency, and in a transmission system where respective transmitters located in or adjacent individual power consumer's meters are arranged to transmit data such as the meter reading to, for example, the power supplier's sub-station, the receiver may be located at a null in the network with respect to one or more of the transmitters: similarly, in a transmission system where a transmitter is arranged to transmit signals from, for example, the power supplier's sub-station to respective receivers located in or adjacent individual power consumer's meters, one or more of the receivers may be located at a null in the network with respect to the transmitter. The drawback is made worse by the fact that the positions of such nulls change continually as the transmission characteristics of the network vary in response to the continually changing load on the network.

It is an object of the present invention to provide transmission systems for transmitting signals over electrical power distribution networks, and transmitters and receivers for use in such systems, in which the effects of the abovementioned drawback are substantially alleviated.

SUMMARY OF THE INVENTION

According to the present invention, there is provided a transmitter for transmitting signals over an electrical power distribution network, the transmitter comprising:

means for producing at least two carrier signals having different frequencies;

means for modulating each of the carrier signals with a digital signal, at least a portion of the digital signal modulating each carrier signal representing the same message; and means for applying the modulated carrier signals to the network for transmission thereover.

Thus if a receiver coupled to the network to receive the signals transmitted by such a transmitter happens to be coupled at a point in the network which is a null for one of the frequencies, that point is not likely also to be a null for the other frequency (or for all the other frequencies, if there are more than two).

According to another aspect of the invention, there is provided a receiver for receiving a transmitted signal comprising at least two carrier signals having different frequencies and each modulated with a digital signal, at least a portion of the digital signal modulating each carrier signal representing the same message and the carrier frequencies being locked together, the receiver comprising:

input circuit means for receiving the modulated carrier signals;

means for sensing which of the first and second modulated carrier signal is being most strongly received;

variable frequency oscillator means; and phase-locked loop means responsive to the sensing means to lock the frequency of the oscillator means to whichever of the first and second modulated carrier signal is being most strongly received and to demodulated at least that carrier signal to derive the digital signal therefrom.

According to yet another aspect of the present invention, there is provided a transmission system for transmitting signals over an electrical power distribution network or a telephone network, the system comprising:

at least one transmitter adapted to be coupled to the network, the or each transmitter comprising a first radio receiver for receiving broadcast control signals and for deriving timing signals therefrom, means for generating at least one network carrier signal, and means responsive to said timing signals for modulating the or each network carrier signal with a digital signal representing a message to be transmitted over the network and for applying the or each modulated network carrier signal to the network, at instants determined by said timing signals, for transmission thereover; and at least one receiver adapted to be coupled to the network, the or each receiver comprising input circuit means for receiving the or each modulated network carrier signal from the network, means for demodulating the or each modulated network carrier signal received by the input circuit means, a second radio receiver for receiving said broadcast control signals and for deriving said timing signals therefrom, and means responsive to the timing signals derived from the second radio receiver for deriving the digital signal from the, or at least one of the, demodulated signals.

According to a still further aspect of the invention, there is provided a transmission system for transmitting signals over an electrical power distribution network or a telephone network, the system comprising:

at least one transmitter adapted to be coupled to the network, the or each transmitter comprising a first radio receiver for receiving a broadcast signal comprising a broadcast carrier signal modulated with control signals, means for generating at least one network carrier signal, and means responsive to at least one of said control signals for modulating the or each network carrier signal with a digital signal representing a message to be transmitted over the network and for applying the or each modulated network carrier signal to the network, the network carrier signal generating means comprising a first variable frequency oscillator from which the or each network carrier signal is derived, and a phase-locked loop arranged to lock the first oscillator frequency, and therefore the frequency of the or each network carrier signal, to the frequency of the broadcast carrier signal; and at least one receiver adapted to be coupled to the network, the or each receiver comprising input circuit means for receiving the or each modulated network carrier signal from the network, means for demodulating the or each modulated network carrier signal received by the input circuit means, a second radio receiver for receiving said broadcast signal, and means for deriving the digital signal from the or at least one of the demodulated signals, the demodulating means comprising a second variablre frequency oscillator for producing one or more local oscillator signals for use in demodulating the modulated network carrier signal or signals, and a phase-locked loop arranged to lock the second oscillator frequency, and therefore the frequency of the or each local oscillator signal, to the frequency of the broadcast carrier signal.

BRIEF DESCRIPTION OF THE DRAWING FIGURES

The invention will now be described, by way of example only, with reference to the accompanying drawings, of which.

DESCRIPTION OF THE PREFERRED EMBODIMENT

Figure 1:
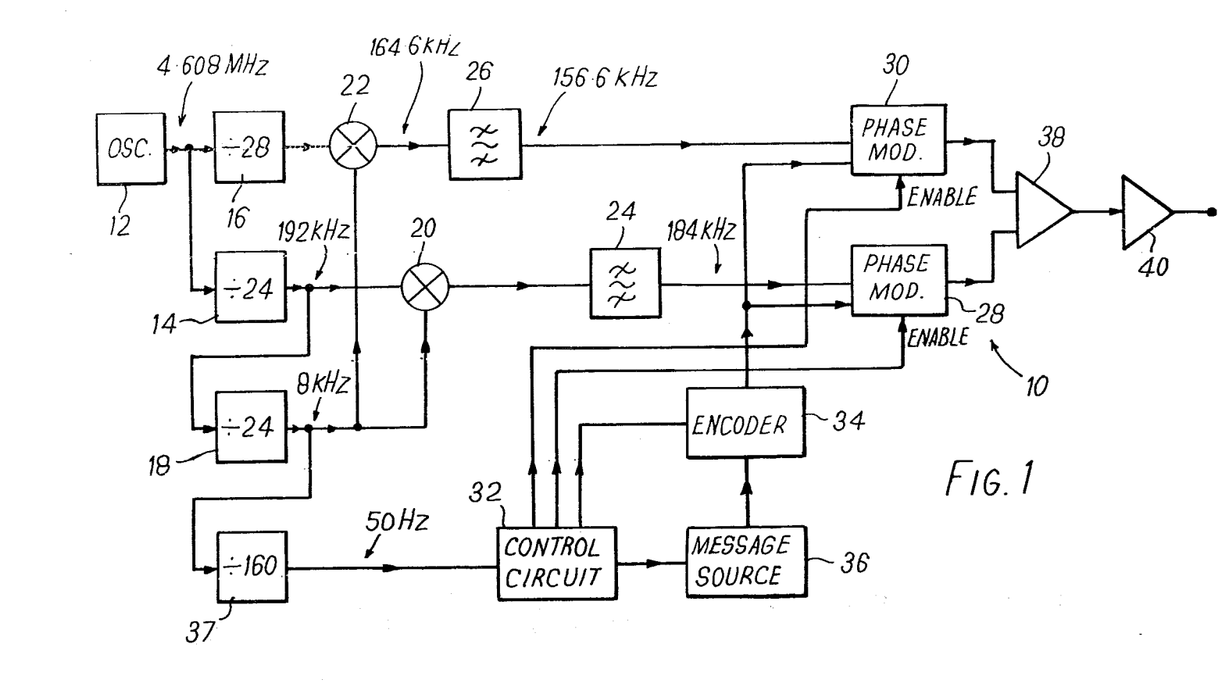
FIG. 1 is a simplified block circuit diagram of a transmitter in accordance with the present invention, for transmitting signals over an electrical power distribution network.

The transmitter shown in FIG. 1 is indicated generally at 10, and is intended, for example, for incorporation in an electricity meter (not shown) coupled to the aforementioned power distribution network to measure the amount of electrical energy supplied to a power consumer via the network. The transmitter 10 comprises a crystal-controlled oscillator 12 having an operating frequency of 4.608 MHz, whose output is connected to two frequency dividers 14 and 16. The dividers 14 and 16 have respective division ratios of 24 and 28, and thus produce respective output signals whose frequencies are 192 kHz and 164.6 kHz respectively. The output of the frequency divider 14 is connected to another frequency divider 18, which again has a division ratio of 24 and thus produces an 8 kHz output signal.

The 192 kHz and 164.6 kHz signals are applied to respective mixers 20 and 22, where they are mixed with the 8 kHz signal from the frequency divider 18. The respective outputs of the mixers 20 and 22 are coupled to respective filters 24 and 26 tuned to pass the difference frequency component in the output signal from their respective mixers, viz (192−8)=184 kHz from the mixer 20 and (164.6−8)=156.6 kHz from the mixer 22. The 184 kHz and 156.6 kHz signals appearing at the respective outputs of the filters 24 and 26 constitute two carrier signals, and are applied to the respective carrier inputs of two phase modulators 28 and 30.

The phase modulators 28 and 30, which can be of any suitable known type, have respective enable inputs for receiving respective enabling signals from a control circuit 32, and respective phase modulation inputs connected to the output of an encoder 34. The input of the encoder 34 is connected to receive a message from a message source 36, and to suitably encode the message into a bit-serial digital signal, including several bits of cyclic redundancy code (CRC) if desired, under the control of the control circuit 32. The bit rate of the digital signal is controlled by the control circuit 32, in response to a 50 Hz signal derived from the 8 kHz signal produced by the divider 18 by a further frequency divider 37 having a division ratio of 160, to be 50 baud (ie 50 bits per second).

A typical message may comprise the current reading of the meter in which the transmitter 10 is incorporated, and/or the current tariff rate to which the matter is set if it is a multi-tariff meter, and/or a signal indicating the meter has been or is being tampered with. Where the message is (or includes) the meter reading, its transmission may be triggered, for example, by an instruction sent as a radio broadcast signal and received by a radio receiver of the kind described in the aforementioned co-pending patent application, the radio receiver also being incorporated in the meter: alternatively, its transmission may obviously be triggered by a mains-borne signal from the supplier. Each message, having been converted into a corresponding bit serial digital signal by the encoder 34, is phase-modulated onto both of the two carrier signals by the phase modulators 28 and 30, as will be described in more detail hereinafter.

The respective outputs of the phase modulators 28 and 30 are then summed in a summing amplifier 38, whose output is amplifed in a power amplifier 40, typically having a power output of about 1 watt, before being applied to the network as a modulation of the 240 volt, 50 Hz, network supply voltage.

It will be appreciated that the bit rate of the digital signal produced by the encoder 34, and the 184 kHz and 156.6 kHz carrier frequencies, are all derived from, and therefore all locked to, the very stable frequency of the crystal-controlled oscillator 12. This arrangement not only has the advantages discussed in the aforementioned co-pending patent application in relation to the reception of the signals transmitted by the transmitter 10, but also has further advantages that will become apparent hereinafter.

The transmitter 10 can be used to transmit the modulated carrier signals over the network in several different ways.

For example, the control circuit 32 can be arranged to enable the phase modulators 28 and 32 sequentially, so that a given message, suitably encoded by the encoder 34, is first applied to the network, preferably several times, as a phase modulation of only one of the two carrier frequencies, and is then applied, again suitably encoded and again preferably several times, as a phase modulation of only the other of the two carrier frequencies. In this case, two complete receivers of the kind described in the aforementioned patent application, one tuned to 184 kHz and the other tuned to 156.6 kHz, could be coupled to the network, eg at the power supplier's sub-station, to receive the signals for onward transmission to the supplier in any convenient way. However, it is preferable to use only one receiver, capable of receiving and locking to either of the two carrier frequencies in a manner analogous to that described in some detail in relation to FIG. 6 of the aforementioned patent application.

In an alternative way of using the transmitter 10, the control circuit is arranged to enable the phase modulators 28 and 30 simultaneously, so that a given message suitably encoded, is simultaneously phase modulated onto both of the two carriers, which are in turn both simultaneously applied to the network after summing in the amplifier 38. In this case, two complete receivers of the kind described in the aforementioned patent application, one tuned to 184 kHz and the other tuned to 156.6 kHz, could again be used if desired. However, it is also possible to use the receiver illustrated in FIG. 2.

Figure 2:
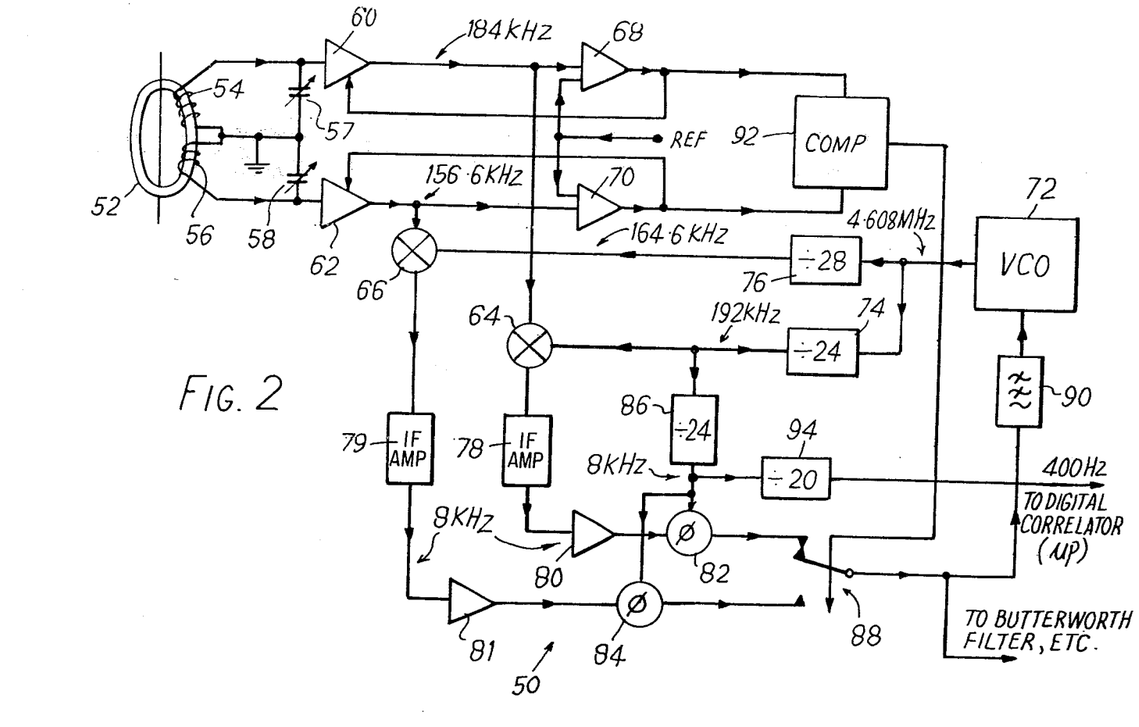
FIG. 2 is a simplified block circuit diagram of a part of a receiver, also in accordance with the present invention, for receiving the signals transmitted by the transmitter of FIG. 1, and FIGS. 3 and 4 are simplified block diagrams of a transmission system in accordance with the invention.

Thus the receiver shown in FIG. 2 is indicated generally at 50, and comprises a ferrite annulus 52 arranged to surround one of the wires of the network, and two coils, 54, 56 each wound upon a respective portion of the annulus 52. The coils 54 and 56 are tuned to 184 kHz and 156.6 kHz respectively by respective tuning capacitors 57 and 58, and thus each pick up a respective one of the modulated carrier signals carried by the supply voltage of the network. The respective signals picked up by the coils 54, 56 are amplified in respective variable-gain radio frequency (RF) amplifiers 60,62, which are again-tuned to 184 kHz and 156.6 kHz respectively, and then applied to respective mixers 64 and 66 and to respective automatic gain-control (AGC) amplifiers 68 and 70.

The AGC amplifiers 68 and 70 compare the respective amplitudes of their respective amplified carrier signals with a reference amplitude in known manner, and each produce an output signal dependent upon the difference between the respective amplitude and the reference amplitude: this output signal is applied to the respective one of the RF amplifiers 60,62 to vary its gain in the sense which tends to reduce the amplitude difference. It will therefore be appreciated that whichever one of the AGC amplifiers 68 and 70 is producing the larger output signal is the one receiving the smaller of the two amplified carrier signals, and thus correponds to the weaker received carrier signals.

In addition to the 184 kHz amplified carrier signal, the mixer 64 is also connected to receive a 192 kHz signal, which is derived from 4.608 MHz voltage-controlled oscillator 72 of the variable frequency crystal-controlled type via a frequency divider 74 having a division ratio of 24. The mixer 64 thus produces an intermediate frequency signal whose frequency is equal to the difference between 192 kHz and 184 kHz, viz 8 kHz. Similarly, in addition to the 156.6 kHz amplified carrier signal, the mixer 66 is also connected to receive a 164.6 kHz signal, which is derived from the oscillator 72 via a frequency divider 76 having a division ratio of 28. The mixer 66 thus also produces an 8 kHz intermediate signal, since the difference between 164.6 kHz and 156.6 kHz is again 8 kHz.

The two 8 kHz intermediate frequency signals produced by the mixers 64 and 66, which signals are still both modulated with the original digital signal, are amplified in respective IF amplifiers 78,79, both tuned to 8 kHz, and squared (ie amplitude-limited) in respective slicers (or squaring amplifiers) 80,81, before being applied to one input of a respective one of two phase detectors 82,84. The other input of each of the phase detectors 82,84 is connected to receive another 8 kHz signal, which is derived from the 192 kHz signal at the output of the frequency divider 74 via another divide-by-24 frequency divider 86.

The respective output signals produced by the phase detectors 82,84 each include, in addition to the original digital signal, a low frequency to DC component whose magnitude is dependent upon the phase difference, and thus the frequency difference, between the respective 8 kHz signals at the inputs of the respective phase detector. The output signals are applied to a change-over switch 88, which although shown for simplicity as a mechanical switch, is in practice constituted by solid state switches or gates. The switch 88 is arranged to couple one or the other of the respective output signals produced by the phase detectors 82, 84 to a low-pass filter 90, which has an upper cut-off frequency of about 0.2 Hz. The filtered output signal produced by the filter 90 is applied to the control input of the oscillator 72, where it varies the operating frequency of the oscillator in the sense which tends to reduce the phase difference between the two 8 kHz signals applied to the particular one of the phase detectors 82,84 currently coupled to the filter 90 by the switch 88.

The position (or switching state) of the switch 88 is controlled by the output of a comparator 92, whose inputs are connected to receive the respective output signals produced by the AGC amplifiers 68 and 70. The comparator 92, which preferably incorporates a small predetermined amount of hysteresis, is arranged to control the switch 98 such that the phase detector 82 or 84 corresponding to whichever of the received carrier signals is being more strongly received is coupled to the filter 90. Thus the frequency of the oscillator 72 is continually being locked to whichever of the received carrier signals is being received more strongly. However, since the frequencies of both carrier signals are themselves locked together, the frequency of oscillator 72 is in fact locked to both carrier frequencies. It is for this reason that operation of the switch 88 as the relative strengths of the received carrier signals reverse, perhaps because the transmission characteristics of the network have been changed by the changing load on the network, does not produce a significant perturbation in the DC component in the filtered output signal from the low pass filter 90, since when one of the phase detectors 82,84 is producing an "in-lock" output signal, the other must also be very nearly doing so.

The signal at the output of the switch 88 is applied to and processed by a Butterworth filter, analogue-to-digital converter and digital correlator identical to those described in the aforementioned patent application, in order to extract the digital signal therefrom. The digital correlator derives the 400 Hz synchronising signal required for its operation from the 8 kHz signal at the output of the frequency divider 86 via another frequency divider 94 having a division ratio of twenty, as described in the aforementioned patent application. Alternatively, since the frequency of the oscillator 72 is in fact locked to both carrier frequencies, the respective signals at the outputs of the phase detectors 82, 84 can be each applied to and processed by such a Butterworth filter, analogue-to-digital converter and digital correlator, so that if for example the digital signal recovered from one of the received carrier signal fails its CRC check, but that recovered from the other carrier signal does not, then the digital signal has still been successfully recovered.

Thus it will be appreciated that the transmitter of FIG. 1, in combination with the various receiver arrangements described, makes up a transmission system which by virtue of the use of at least two carrier signals of different frequencies substantially alleviates the problems caused by nulls in the network. If a third carrier signal at yet another different frequency is added, with the third frequency also locked to the first two, and all three digital signals are recovered in a manner analogous to that described in relation to FIG. 2, then even further transmission integrity is provided. Thus the recovered digital signals can be compared in pairs, and only accepted as valid if two or more agree. Such an arrangement would make attemps to defraud the supplier by modulating false signals onto the network extremely difficult.

Figure 5:
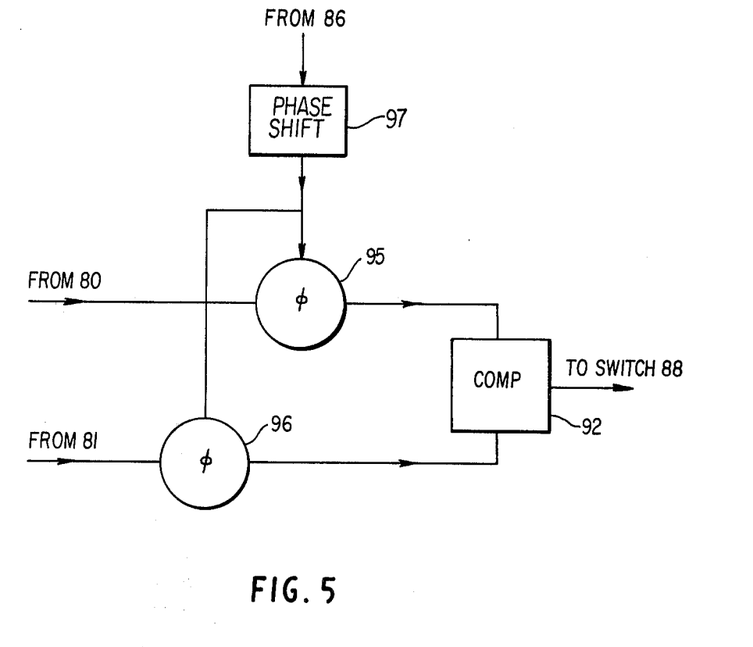
FIG. 5 shows a modified version of a portion of the circuit of FIG. 2.

Several other modifications can be made to the described embodiment of the invention. For example, as shown in FIG. 5 the comparator 92, instead of being connected to the respective outputs of the AGC amplifiers 68 and 70, can be connected to the respective outputs of two further phase detectors 95 and 97, which are each connected to receive the same inputs as a respective one of the phase detectors 82 and 84, but with one of the inputs phase shifted by 90° by means of phase shifter 97: the further phase detector producing the larger output signal then corresponds to the modulated carrier signal being more strongly received.

In yet another modification, the switch 88 and the comparator 92 are omitted, and the outputs of the phase detectors 82,84 are simply summed. This is made possible by the fact that the two carrier frequencies are locked to each other by virtue of being derived from the same master oscillator. Indeed, the outputs of the slicers 80 and 81 could be summed and applied to one input of a single phase detector, eg the phase detector 82, and the other phase detector 84 could be omitted. In general, if a plurality of carrier frequencies are all derived using frequency synthesizing techniques from a master oscillator at the transmitter, so that they are locked to each other, then they can be processed at the receiver, again using frequency synthesizing techniques, to yield respective signals at a common frequency. All these signals at the common frequency can then be summed, and a variable-frequency oscillator in the receiver can be locked to the common frequency by a phase-locked loop.

As already mentioned, the meter in which the transmitter 10 is incorporated may also have a radio receiver of the kind described in the aforementioned co-pending patent application incorporated therein (or associated therewith). In this case, it will be appreciated that at least the oscillator 12 and the dividers 14, 18 and 37 can be constituted by corresponding elements of the radio receiver, ie the oscillator 12 and the dividers 14, 18 and 37 can be common to both the transmitter 10 and the radio receiver. This means that all the operating frequencies of the transmitter 10, and particularly the two carrier frequencies, are phase locked to the very stable carrier frequency of the broadcast signal received by the radio receiver.

Even more importantly, however, the radio receiver can control the detailed timing of the message transmitted by the transmitter 10, that is it can control not only the instant of commencement of the message, but also its duration and the relative timing of the various items of data making up the message, right down to the level of individual digital bits. A further such radio receiver can then be incorporated in or associated with the receiver 50, the further radio receiver providing for the receiver 50 not only local oscillator signals whose frequency is again phase locked to the carrier frequency of the broadcast signal, and which can be used to demodulate the mains-borne modulated carrier signals received by the receiver 50 from the power distribution network, but also control signals which effectively inform the receiver 50 (a) which transmitter 10 out of a plurality of such transmitters is currently transmitting, and (b) when to look for each item of the data making up the various messages. Such a transmission system is illustrated somewhat diagramatically in FIGS. 3 and 4.

Figure 3:
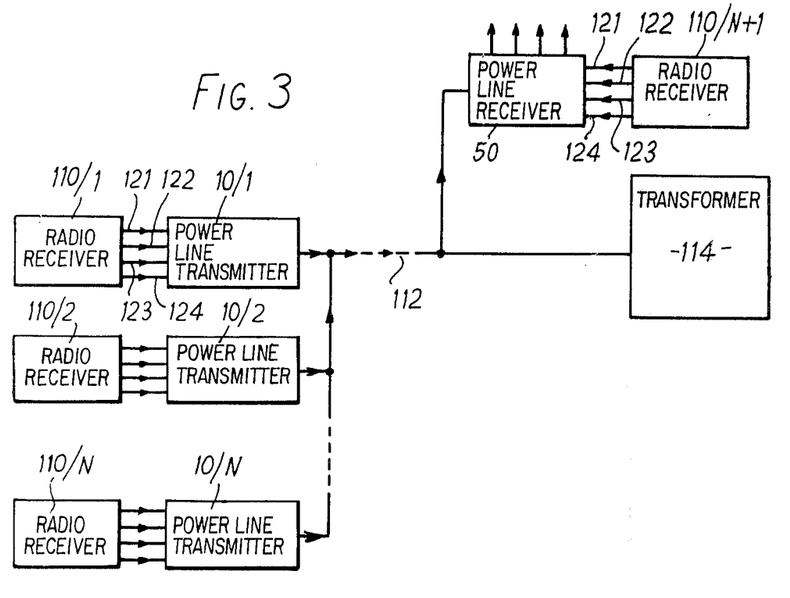

Thus the transmission system of FIG. 3 comprises a plurality of transmitters 10/1, 10/2, . . . 10/N each connected to be controlled by a respective radio receiver 110/1, 110/2, . . . 110/N. Each of the N transmitter/radio receiver combinations is typically associated with or incorporated in a respective power consumer's electricity meter, as described earlier in relation to the transmitter 10, and the N transmitters 10/1 to 10/N are all coupled to a single power distribution network 112 which is coupled to the secondary winding (not shown) of a distribution transformer 114 at the power suppliers substation: typically, about 500 customers are supplied from a single such distribution transformer.

The system of FIG. 3 also includes a single one of the receivers 50, connected to be controlled by a radio receiver 110/(N+1) similar to the radio receivers 110/1 to 110/N. The receiver 50 is located at the supplier's substation as mentioned earlier, and more specifically, is connected to the network 112 at a point adjacent the connection between the network and the secondary winding of the transformer 114. The receiver 50 may be arranged to operate a recording device (not shown,) eg a printer or a magnetic recorder: alternatively or additionally, it may be connected via a private or public telephone line to other premises of the power supplier, eg premises where the consumers' bills are prepared.

As can be seen in FIG. 3, each of the radio receivers 110/1 to 110/(N+1) has four output lines. These output lines are indicated at 121 to 124, and the way in which they are energised and their function will now be described in relation to the single radio receiver 110 of FIG. 4. However, it is to be understood that all the radio receivers 110/1 to 110/N behave identically to this single receiver.

As described in the aforementioned co-pending patent application each broadcast message received by the radio receiver 110 starts with an 8-bit start-of-frame code, which is detected and flagged in blocks 152, 153 of FIG. 3A of said application. Detection of the frame code is also arranged to energise the output 121 of the radio receiver 110 (and of all the other radio receivers), which sets a bistable circuit 130 forming part of the control circuit 32 of the transmitter 10. The bistable circuit 130 in turn enables two AND gates, indicated at 132 and 134 respectively.

Detection of the frame code indicates a message is being broadcast, and in particular that the individual bits making up the frame code and the rest of the message are being detected. The bit transitions, ie the instants when one bit ends and the next bit begins, are identified in block 136 of FIG. 3A of the aforementioned co-pending patent application, and the radio receiver 110 is arranged to produce a short clock pulse at its output 122 at each such bit transition. These short clock pulses, which will be referred to as BIT SYNC pulses are produced in all the transmitter/radio receiver combinations, have a frequency of 50 Hz, and are used in place of the 50 Hz pulses produced by the frequency divider 37 of FIG. 1 (which can be omitted). Thus they are applied via the AND gate 134, to a counter 136, where they are counted to determine when the end of the message has been reached: they are also applied to the shift input of a shift register 138, which is connected to be enabled by the set output of a bistable circuit 140. The overflow output of the counter 136 is connected to reset the bistable circuits 130, 140 at the end of each message (ie typically after 92 bits have been counted)

When it is desired to remotely read the meters, an initial message containing a command, which will be referred to as the TRANSFER READING command, is broadcast.

All the transmitter/radio receiver combinations are arranged to be responsive to this command, detection of the command energising the output 123 of the radio receiver 110 (and of all the other radio receivers). Energisation of the output 123 is operative via the AND gate 132 to strobe the current meter reading (already correctly encoded for phase modulation) from the message source 36 into the shift register 138. Thus, the respective current meter readings of all the consumers connected to the network 112 are simultaneously entered into their respective counterparts of the register 138, for subsequent transmission over the network 112.

Each of the N transmitter/radio receiver combinations is assigned a unique address, and these addresses are broadcast successively in successive messages following the initial message. When a given transmitter/radio receiver combination detects its own unique address, it energises the output 124, thus setting the bistable circuit 140, and thereby enabling the shift register 138.

The BIT SYNC pulses are then operative to shift the meter reading in the shift register 138 into the phase modulators 28 and 30 of FIG. 2, for transmission over the network 112 as described hereinbefore. Thus it will be appreciated that each 20 millisecond bit of the meter reading being transmitted as a message over the network 112 is substantially coincident with, or synchronised with, a respective possible bit position in the broadcast message being received by the radio receivers 110/1 to 110/N.

It will further be appreciateed that the radio receiver 110/(N+1) associated with the single receiver 50 substantially simultaneously receives the same broadcast signal, containing the same messages as are being received by the radio receivers 110/1 to 110/N. Consequently, the radio receiver 110/(N+1) produces on its outputs 121 to 124 FRAME CODE DETECTED signals, BIT SYNC pulses, a TRANSFER READING signal and ADDRESS DETECTED signals respectively, which are substantially coincident with the corresponding signals produced by the radio receivers 110/1 to 110/N.

Additionally, the VCO 72 and the dividers 74 and 86 of receiver 50 (see FIG. 2) are constituted by the corresponding elements in the radio receiver 110/(N+1), the operating frequency of the VCO 72 being phase-locked to the carrier frequency of the received broadcast signal. As a result, the phase detectors 82, 84 of FIG. 2 can effectively be replaced by (or operate as) mixers, and their outputs, or summed outputs, can be applied to a simplified microprocessor-based digital correlator which correlates them with a reference sine wave whose timing (ie phase) is determined by the BIT SYNC pulses from the radio receiver 110/(N+1). This enormously simplifies the task of demodulating the mains-borne signals, since (a) the radio receiver 110/(N+1) can be provided with a particularly well-positioned aerial and can be particularly sensitive (since typically only one such radio receiver per 500 consumers is required), so that (b) local oscillator signals and BIT SYNC pulses coherent with the transmitted mains-borne signals can be produced completely independently of the transmission characteristics of the network 112.

Each time the receiver 50 decodes a meter reading transmitted over the network 112, which it does in response to each ADDRESS DETECTED signal from the radio receiver 110/(N+1), it associates the decoded meter reading with the detected address before outputting it to the aforementioned recording device and/or to the premises of the power supplier.

Figure 4:
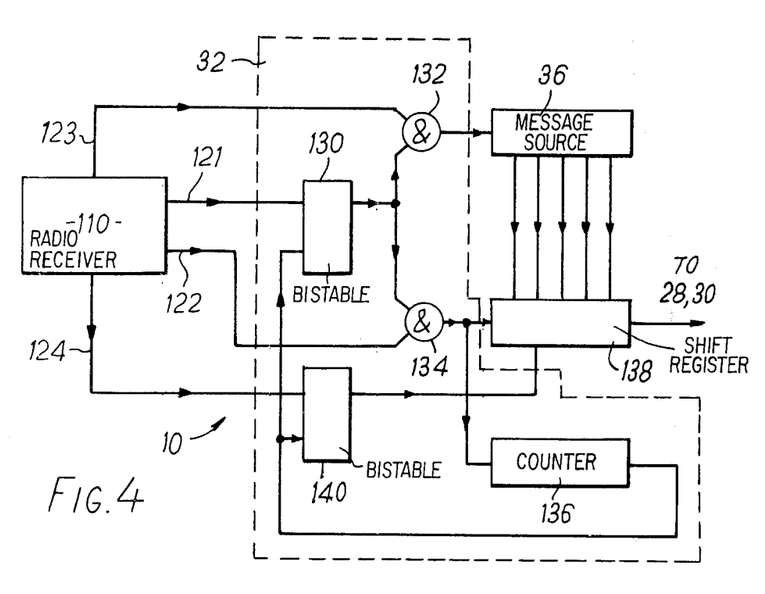

A number of modifications can be made to the embodiment of the invention of FIGS. 3 and 4. For example, each of the transmitter/radio receiver combinations can be "time-addressed" rather than being specifically addressed by a digital signal. In other words, the transmitter/radio receiver combinations can be arranged in a sequence such that the first one transmits in response to the first frame code received after the TRANSFER READING signal, the second transmits in response to the second frame code, and so on. The receiver 50 is then merely arranged to associate each received and decoded meter reading with a digital signal indicating its position in the sequence. Also, since the transmission of the message over the network 112 by the transistors 10/1 to 10/N, and their receipt by the receiver 50, is controlled by the radio receivers 110/1 to 110/(N+1) respectively, the signal-to-noise ratio is much improved, and it is possible to consider using only one carrier frequency over the network instead of two. Finally, although the transmitters 10/1 to t 10/N are described as being coupled to the receiver 50 via the power distribution network 112, they can alternatively be coupled to the receiver 50 via a public or private telephone or like network.

I claim:

1. A receiver for coupling to a power distribution network to receive a signal transmitted over the network and comprising at least two carrier signals having different frequencies and each modulated with a digital signal, at least a portion of the digital signal modulating each carrier signal representing the same message and the carrier frequencies being locked together, the receiver comprising:

input circuit means for receiving the modulated carrier signals;

means for sensing which of the first and second modulated carrier signals is being most strongly received;

variable frequency oscillator means; and phase-locked loop means responsive to the sensing means to lock the frequency of said oscillator means to whichever of the first and second modulated carrier signals is being most strongly received and to demodulate at least that carrier signal to derive the digital signal therefrom, said phase-locked loop comprising:

means for deriving first and second intermediate signals from the first and second modulated carrier signals respectively, and third and fourth intermediate signals, substantially equal in frequency to the first and second intermediate signals respectively, from said oscillator means;

a first phase detector responsive to the first modulated carrier signal and a signal derived from the first and third intermediate frequency signals to produce a first output signal having a DC component dependent on the phase difference therebetween, said first output signal also containing said digital signal;

a second phase detector responsive to the second and fourth intermediate frequency signals to produce a second output signal having a DC component dependent on the phase difference therebetween, said second output signal also containing said digital signal;

low pass filter means; and switching means responsive to the sensing means to apply to said oscillator means, via the low pass filter means, whichever of the first and second output signals corresponds to the modulated carrier signal being most strongly received, to vary the frequency of said oscillator means in the sense which tends to reduce the phase difference producing the output signal.

2. A receiver as claimed in claim 1, wherein said deriving means comprises:

first and second frequency dividers for deriving from said oscillator means first and second oscillator signals whose respective frequencies differ from the first and second carrier frequencies respectively by the same difference frequency;

a first mixer responsive to the first modulated carrier signal and the first oscillator signal to produce said first intermediate signal at said difference frequency, said first intermediate signal being applied to one input of the first phase detector;

a second mixer responsive to the second modulated carrier signal and the second oscillator signal to produce said second intermediate signal at said difference frequency, said second intermediate signal being applied to one input of the second phase detector; and a third frequency divider for deriving from said oscillator means a third oscillator signal at said difference frequency, said third oscillator signal being applied to the other input of each of the phase detectors as said third and fourth intermediate signals respectively.

3. A receiver as claimed in claim 1, wherein the input circuit means comprises first and second input circuits respectively tuned to the first and second carrier frequencies for receiving the first and second modulated carrier signals respectively, each of the input circuits includes a respective automatic gain control circuit for producing a gain control signal for controlling the gain of the input circuit, and the sensing means is arranged to sense the relative magnitudes of the respective gain control signals.

4. A receiver as claimed in claim 1, wherein the sensing means comprises third and fourth phase detectors, the third phase detector being arranged to receive the same signals as the first phase detector, but with one of said signals phase-shifted by substantially 90°, and the fourth phase detector being arranged to receive the same signals as the second phase detector, but with one of said signals phase-shifted by substantially 90°, and means for sensing the relative magnitudes of the output signals produced by the third and fourth phase detectors.

5. A transmission system for transmitting signals over an electrical power distribution network or a telephone network, the system comprising:

at least one transmitter adapted to be coupled to the network, the or each transmitter comprising a first radio receiver for receiving broadcast control signals and for deriving timing signals therefrom, means for generating at least one network carrier signal, and means responsive to said timing signals for modulating the or each network carrier signal with a digital signal representing a message to be transmitted over the network and for applying the or each modulated network carrier signal to the network, at instants determined by said timing signals, for transmission thereover; and at least one receiver adapted to be coupled to the network, the or each receiver comprising input circuit means for receiving the or each modulated network carrier signal from the network, means for demodulating the or each modulated network carrier signal received by the input circuit means, a second radio receiver for receiving said broadcast control signals and for deriving said timing signals therefrom, and means responsive to the timing signals derived from the second radio receiver for deriving the digital signal from the, or at least one of the, demodulated signals.

6. A transmission system as claimed in claim 5, for use when said broadcast signal comprises a broadcast carrier signal modulated with said control signals, wherein the network carrier signal generating means comprises a first variable frequency oscillator for producing a first oscillator signal, means for deriving the or each network carrier signal from said first oscillator signal, and a first phase-locked loop responsive to the broadcast carrier signal received by the first radio receiver and to the first oscillator signal to lock the first oscillator frequency, and therefore the frequency of the or each network carrier signal, to the frequency of the broadcast carrier signal, and wherein the demodulating means comprises a second variable frequency oscillator for producing a second oscillator signal, and means for deriving from said second oscillator signal one or more local oscillator signals for use in demodulating the modulated network carrier signal or signals, and a second phase-locked loop responsive to the broadcast carrier signal received by said second radio receiver and to the second oscillator signal to lock the second oscillator frequency, and therefore the frequency of the or each local oscillator signal, to the frequency of the broadcast carrier signal.

7. A transmission as claimed in claim 5 or 6, for use in transmitting signals from a plurality of electrical power consumers to a single receiver, the system comprising a respective such transmitter for each consumer, each transmitter being assigned a respective different address code, the arrangement being such that the transmitters are addressed sequentially by said broadcast control signals to cause them to sequentially transmit their respective messages over the network to the receiver, the receiver receiving said address codes from its own radio receiver substantially simultaneously with the transmitters and being arranged to associated each received message with a signal indicative of the respective address code of the transmitter from which the message was transmitted.

8. A transmission system as claimed in claim 5 or 6, for use in transmitting signals from a plurality of electrical power consumers to a single such receiver, the system comprising a respective such transmitter for each consumer, the arrangement being such that the transmitters are caused by said broadcast control signals to sequentially transmit their respective messages over the network to the receiver in a predetermined sequence, the receiver being responsive to the broadcast control signals received by its own radio receiver to associate each received message with a respective signal indicative of the relative position of the message in the sequence, and therefore indicative of the transmitter from which the message was transmitted.

9. A transmission system as claimed in claim 7, for use when each said message is or includes a measurement of the amount of electrical energy supplied to the respective consumer over a predetermined period, wherein each transmitter comprises a store for receiving the measurement prior to transmission of the message and means responsive to a particular broadcast control signal for transfering the current value of the measurement into the store, whereby the respective current values of the measurements relating to all the consumers are simultaneously transfered into their respective stores for subsequent sequential transmission to the single receiver.

10. A transmission system as claimed in claim 8, for use when each said message is or includes a measurement of the amount of electrical energy supplied to the respective consumer over a predetermined period, wherein each transmitter comprises a store for receiving the measurement prior to transmission of the message and means responsive to a particular broadcast control signal for transfering the current value of the measurement into the store, whereby the respective current values of the measurements relating to all the consumers are simultaneously transfered into their respective stores for subsequent sequential transmission to the single receiver.

11. A receiver for coupling to a power distribution network to receive a signal transmitted over the network and comprising at least first and second carrier signals having different frequencies and each modulated with the same digital signal, the carrier frequencies being locked together, the receiver comprising:
input circuit means for receiving the modulated carrier signals;
variable frequency oscillator means;
means for deriving from said oscillator means first and second oscillator signals whose frequency different equals the frequency difference between said first and second carrier signals, and a third oscillator signal whose frequency is equal to said frequency difference;
first mixer means responsive to the first carrier signal and the first oscillator signal to produce a first intermediate signal whose frequency is equal to said frequency difference;
second mixer means responsive to the second carrier signal and the second oscillator signal to produce a second intermediate signal whose frequency is equal to said frequency difference; and
phase-locked loop means responsive to the intermediate signals and the third oscillator signal to lock the frequency of said oscillator means to whichever of the first and second carrier signals is being most strongly received and to demodulate at least the intermediate signal obtained from that carrier signal to derive the digital signal therefrom.

12. A transmission system for transmitting carrier-borne digital signals of predetermined bit rate over an electrical power distribution network whose transmission characteristics can vary at a rate comparable with said bit rate, the system comprising:
at least one transmitter adapted to be coupled to the network, the or each transmitter comprising means for producing at least two coherent carrier signals having different frequencies, means for simultaneously modulating each of the carrier signals with a digital signal, at least a portion of the digital signal modulating each carrier signal representing the same message, and means for simultaneously applying the modulated carrier signals to the network for transmission thereover; and
a least one receiver adapted to be coupled to the network, the or each receiver comprising input circuit means for receiving the modulated carrier signals from the network, means for sensing which of the modulated carrier signals is being most strongly received, variable frequency oscillator means, and phase-locked loop means responsive to the sensing means to lock the frequency of said oscillator means to whichever of the modulated carrier signals is being mostly strongly received and to demodulate at least that carrier signal to derive the digital signal therefrom.

13. A transmission system as claimed in claim 12, wherein the phase-locked loop means of said at least one receiver comprises:
means for deriving first and second intermediate signals from respective ones of said at least two modulated carrier signals, and third and fourth intermediate signals, substantially equal in frequency to the first and second intermediate signals respectively, from said oscillator means;
a first phase detector responsive to the first and third intermediate frequency signals to produce a first output signal having a DC component dependent on the phase difference therebetween, said first output signal also containing said digital signal;
a second phase detector responsive to the second and fourth intermediate frequency signals to produce a second output signal having a DC component dependent on the phase difference therebetween, said second output signal also containing said digital signal;
low pass filter means; and
switching means responsive to the sensing means to apply to said oscillator means, via the low pass filter means, whichever of the first and second output signals corresponds to the modulated carrier signal being most strongly received, to vary the frequency of said oscillator means in the sense which tends to reduce the phase different producing that output signal.

14. A transmission system as claimed in claim 13, wherein said deriving means comprises:
first and second frequency dividers for deriving from said oscillator means first and second oscillator signals whose respective frequencies differ from the first and second carrier frequencies respectively by the same difference frequency;
a first mixer responsive to the first modulated carrier signal and the first oscillator signal to produce said first intermediate signal at said different frequency, said first intermediate signal being applied to one input of the first phase detector;

a second mixer responsive to the second modulated carrier signal and the second oscillator signal to produce said second intermediate signal at said difference frequency, said second intermediate signal being applied to one input of the second phase detector; and a third frequency divider for deriving from said oscillator means a third oscillator signal at said different frequency, said third oscillator signal being applied to the other input of each of the phase detectors as said third and fourth intermediate signals respectively.

15. A transmission system as claimed in claim 12, wherein the input circuit means of said at least one receiver comprises first and second input circuits respectively tuned to the respective frequencies of said at least two modulated carrier signals, for receiving respective ones of said modulated carrier signals, each of said input circuits including a respective automatic gain control circuit for producing a gain control signal for controlling the gain of the input circuit, and wherein the sensing means of said at least one receiver is arranged to sense the relative magnitudes of the respective gain control signals.

16. A transmission system as claimed in claim 13, wherein the sensing means of said at least one receiver comprises third and fourth phase detectors, the third phase detector being arranged to receive the same signals as the first phase detector, but with one of said signals phase-shifted by substantially 90°, and the fourth phase detector being arranged to receive the same signal as the second phase detector, but with one of said signals phase-shifted by substantially 90°, and means for sensing the relative magnitudes of the output signals produced by the third and fourth phase detectors.

17. A transmission system as claimed in claim 12, wherein the carrier signal producing means of said at least one transmitter comprises a master oscillator, and respective frequency dividers for deriving each of the carrier signals from the master oscillator, said carrier frequencies being non-harmonically related.

18. A transmission system as claimed in claim 17, wherein the bit rate of the digital signal is determined by a clock signal derived from said master oscillator via another frequency divider.

19. A transmission system as claimed in claim 12, wherein the modulating means of said at least one transmitter comprises means for phase modulating each of the carrier signals with the digital signals.

20. A transmission system for transmitting carrier-borne digital signals of predetermined bit rate over an electrical power distribution network whose transmission characteristics can vary at a rate comparable with said bit rate, the system comprising:

at least one transmitter adapted to be coupled to the network, the or each transmitter comprising means for producing at least two coherent carrier signals having different frequencies, means for simultaneously modulating each of the carrier signals with a digital signal, at least a portion of the digital signal modulating each carrier signal representing the same message, and means for simultaneously applying the modulated carrier signals to the network for transmission thereover; and at least one receiver adapted to be coupled to the network, the or each receiver comprising input circuit means for receiving the modulated carrier signals, variable frequency oscillator means, means for deriving from said oscillator means first and second oscillator signals whose frequency difference equals the frequency difference between said at least two carrier signals and third oscillator signal whose frequency is equal to said frequency difference, first mixer means responsive to one of said at least two carrier signals and the first oscillator signal to produce a first intermediate signal whose frequency is equal to said frequency difference, second mixer means responsive to the other of said at least two carrier signals and the second oscillator signal to produce a second intermediate signal whose frequency is equal to said frequency difference, and phase-locked loop means responsive to the intermediate signals and the third oscillator signal to lock the frequency of said oscillator means to whichever of said at least two carrier signals is being most strongly received and to demodulate at least the intermediate signal obtained from that carrier signal to derive the digital signal therefrom.

21. A transmission system as claimed in claim 20, wherein the carrier signal producing means of said at least one transmitter comprises a master oscillator, and respective frequency dividers for deriving each of the carrier signals from the master oscillator, said carrier frequencies being non-harmonically related.

22. A transmission system as claimed in claim 21, wherein the bit rate of the digital signal is determined by a clock signal derived from said master oscillator via another frequency divider.

23. A transmission system as claimed in claim 20, wherein the modulating means of said at least one transmitter comprises means for phase modulating each of the carrier signals with the digital signal.

* * * * *